Aug. 22, 1961     C. F. CASSELL     2,996,776
INCISION CLOSING MEANS OR STITCHING DEVICE
Filed Feb. 17, 1958
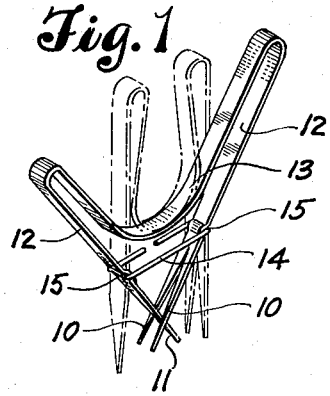
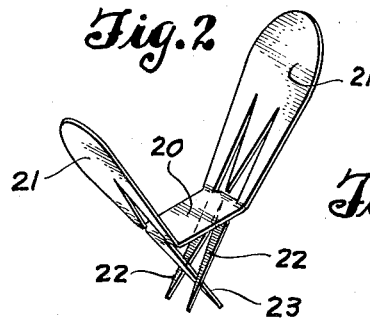
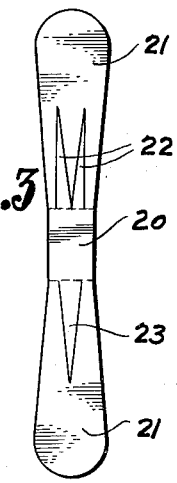
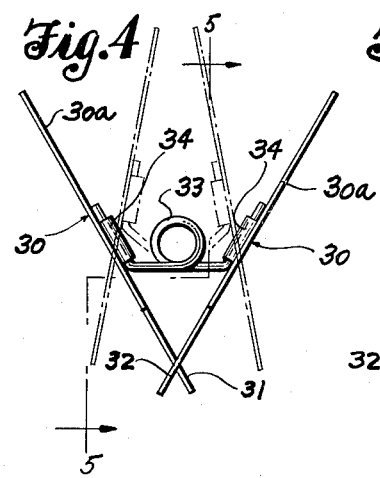
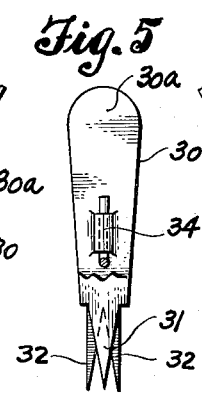
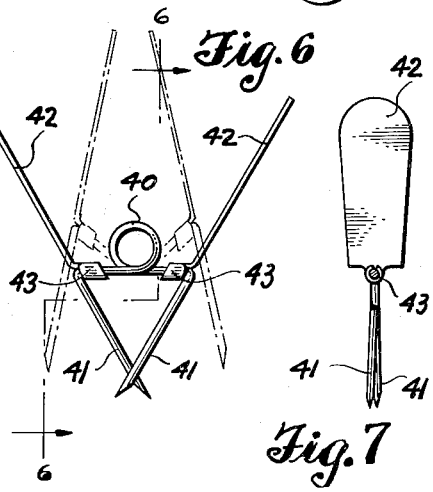
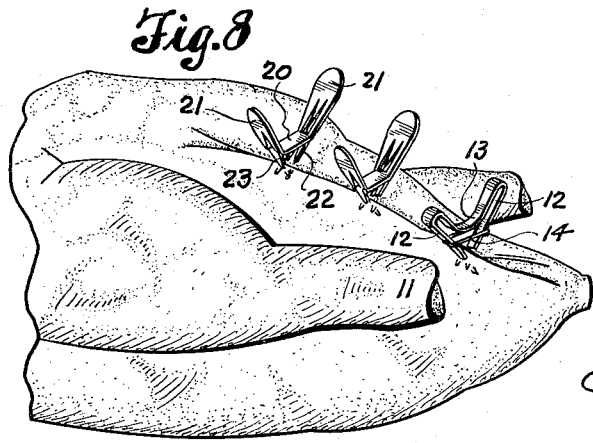
INVENTOR.
CHARLES F. CASSELL
BY
Robinson + Berry
ATTORNEYS United States Patent Office
2,996,776
Patented Aug. 22, 1961

2,996,776
INCISION CLOSING MEANS OR
STITCHING DEVICE
Charles F. Cassell, 1822 S. 146, Seattle, Wash., assignor to Jeannette C. Cassell
Filed Feb. 17, 1958, Ser. No. 715,598
1 Claim. (Cl. 24—87)

This invention relates to incision closing means or stitching devices of those kinds designed primarily for the closing of the incisions made in fowls such as turkeys, chickens, and the like, after being drawn, cleaned and stuffed for roasting.

More particularly this invention pertains to devices which are of the same general character as that disclosed in my co-pending application which was filed on April 4, 1957, under Serial No. 650,737.

It is the principal object of this invention to provide various forms of stitching devices or stitching clips, which embody therein the primary objects which were enumerated in my prior application for patent above identified, but which disclose various modifications and details of construction; it being the primary object, in each of the various modifications of the invention, to provide a resilient stitching clip with paired and cooperatively arranged levers, joined across their medial portion, and provided with prongs at one end that may be spread apart by pressing the opposite or handle ends of the levers together, and which prongs, when spread apart, may be projected through the skin at opposite sides of the incision that is to be closed, and then, upon release of the pressing force, will be sprung together thus to close the incision at the place of application of the clip.

Further objects of the invention reside in the provision of clips of the above stated character wherein each comprises paired and oppositely disposed lever-like portions which are pointed or sharpened at their inner ends for easy projection into the skin or flesh of the fowl at opposite sides of the incision and which are joined intermediate their ends by a link or connector which prevents spreading of the levers after having their pointed ends thus applied, and which levers are so applied are placed under spring tension whereby the incision closing force will be applied.

Further objects of the invention reside in the details of construction and formation of the various devices herein shown and described and in their mode of use.

In accomplishing the above mentioned and other objects, I have provided the improved details of construction, the preferred forms of which are illustrated in the accompanying drawings, wherein:

FIG. 1 is a perspective view of an incision closing or stitching clip of the present invention as made from an elongated strip of spring metal and using a wire link as a cross-tie member.

FIG. 2 is a perspective view of a stitching clip of a modified form, of one piece construction, stamped from sheet metal.

FIG. 3 is a flat view of the formed blank from which the clip of FIG. 2 is made.

FIG. 4 is an edge view of another modification of the present clip, employing a spring wire coil for joining the oppositely related levers and for supplying the spring tension.

FIG. 5 is a sectional view of the device of FIG. 4 taken on line 5—5 in FIG. 4.

FIG. 6 is a view of a clip of yet another form.

FIG. 7 is a sectional view of the clip of FIG. 6 taken on line 7—7 in FIG. 6.

FIG. 8 is a view illustrating the mode of use of clips of this invention for closing the incision of a fowl after being stuffed, as for baking.

The present clip may be put to various uses, however, its primary purpose has been that illustrated in FIG. 8 and it will be described in connection with this use with the understanding that this is not to be considered as a limitation.

Referring more in detail to the drawings.

In FIG. 1, I have shown a stitching clip embodied by this invention that is formed from a single, flat and rather elongated strip of spring metal. This strip is formed at one end with a deep V-shaped notch which sets off two laterally spaced, sharpened prongs 10—10, and at its opposite end it is sharpened in such manner as to provide a single sharpened prong 11. The strip is bent at distances equally from its opposite ends in such manner as to dispose its opposite end portions 12—12, which are herein designated as levers, in downwardly converged relationship with the prong 11 of the one lever extended between the prongs 10—10 of the other lever. These levers are straight and are joined at their outer ends by a downwardly bowed connecting portion 13. The levers 12—12 also are joined together medially of their ends by a wire link or loop 14 that, at its ends, is disposed in seats 15 formed in the levers.

The particular way in which the strip is bent and the spring tension of the part 13 is such as to urge the joined upper ends of the levers apart urge their pronged lower ends together. Thus, the normal relationship of the various parts of the clip are as shown in full lines in FIG. 1. However, by holding the outer end portions of the levers between thumb and forefinger, and pressing them together, as shown in dotted lines, the pronged ends of the levers will be sprung apart as to their showing in dash lines.

In using this clip for stitching, or for incision closing, as has been illustrated in FIG. 8, the outer ends of the levers are grasped between thumb and finger and pressed together, as to their dash line showing in FIG. 1. Then the pronged ends of the levers are pressed through the skin of the fowl at opposite sides of the incision until their insertion is stopped by the cross-link 14 and then the clip is released. Upon release, the spring tension in part 13 causes the outer ends of the levers to be sprung apart and their pronged ends to be moved together; this being effected by reason of the tie between levers as effected by the wire link 14. This closes the incision. After the fowl has been roasted, the clip can be withdrawn merely by pressing the outer ends of the levers together and pulling the clip outward.

The stitching device which has been shown in FIGS. 2 and 3, is cut or die stamped from sheet metal of proper resiliency and thickness. Generally, it is first formed in the flat shape shown in FIG. 3. Its opposite end portions are then bent back toward each other to give the clip the form in which it is shown in FIG. 2, to provide a flat and relatively short medial portion 20 and opposite end portions 21—21 that are directed upwardly in divergence from its opposite ends. Struck outwardly from the parts 21—21, and then bent back, to extend away from but in the planes of these parts, as shown in FIG. 2, are cooperatively arranged prongs 22—22 and 23. These prongs correspond in relationship and purpose to the prongs 10—10 and 11 of the device of FIG. 1, and the part 20 corresponds to the connecting link 14.

To use the device of FIG. 2, the parts 21—21 are grasped between thumb and forefinger, and pressed together. In doing this, the various parts of the clip are sprung from the normal relationship in which they are shown in FIG. 2 to a relationship corresponding to the showing of parts in dash lines in FIG. 1. The clip is then applied to the fowl by inserting the prongs 22—22 and 23 through the skin at opposite sides of the incision until stopped by the member 20, and then releasing the clip.

The clip which is illustrated in FIGS. 4 and 5 comprise a pair of levers 30—30 cut or die stamped from sheet metal to the form shown in FIG. 5. Each lever is flat and has a relatively wide upper end, or gripping portion 30a. One lever terminates at its lower end in a single sharpened prong 31 and the other terminates in two prongs 32—32. These two lever forming parts 30—30 are joined by a length of spring wire formed into a coil 33. Opposite end portions of the wire which forms the coil are applied to loops 34—34 that are struck inwardly from the medial portions of the levers and which extend in their lengthwise directions. The bending of the wire and the application of its end portions is such that it operates to yieldingly retain the levers in the normal diverging relationship in which they are shown in FIG. 4, with the pronged ends interengaged and in crossed relationship.

The application of the clip of FIG. 4 to the fowl is effected in the same manner as the previously described clips are applied. The wire coil 33 in this instance serves both as the lever connector and also it supplies the incision closing tensions.

The clip shown in FIGS. 6 and 7 comprises a single piece of spring wire formed into a coil 40. The opposite end portions of the wire extend horizontally in alignment, in opposite directions from the coil and to equal extent and are then bent downwardly and into crossed relationship. The ends of the wire are sharpened or pointed. The crossed parts 41—41 correspond to the crossed prongs of the devices of FIGS. 1, 2 and 3.

Fixed to the oppositely extending end portions of the coil, adjacent the loop or coil 40, are finger hold portions 42—42, each having an inner end portion 43 bent around the wire as shown in FIG. 7. Normally the finger hold portions 43—43 are in divergence, as shown in full lines in FIG. 6. When they are pressed together, the prongs 41—41 are sprung apart, as shown in dash lines, thus, this device can be applied and used in the same manner as the devices of FIGS. 1, 2 and 4.

It is to be observed that in each of these clips, a pair of cooperatively arranged levers are normally held in convergence as in FIG. 4, but may be sprung by pressing the outer end portions of the levers together, to spread their pronged ends apart and provide for their application to the fowl along opposite sides of the incision. Then, when the opening force is released, the spring tension in the clip moves the prongs together, thus, to close the incision. In each device, this closing operation is made possible by reason of the connecting portions extending between the coacting levers. In FIG. 1 this connector is the link 14. In the device of FIG. 2, it is the plate 20. In the clips of FIGS. 4 and 6 it is the loop forming wires.

Devices of this kind are easy to apply; easy to remove; are relatively inexpensive and can be repeatedly used.

What I claim is:

An incision closing clip comprising a single, continuous strip of spring steel and a tying link; said strip including a pair of legs formed at opposite ends thereof and a leg joining portion integral with and positioned between said legs, said first pair of legs including inner and outer end portions, the inner ends of said first pair of legs being pointed and normally directed in converging relationship, the outer ends of said first pair of legs being integral with said leg joining portion, said leg joining portion being bowed between its ends toward said inner ends of the first pair of legs, said leg joining portion having opposite end portions lying substantially parallel to said outer end portions and said tying link being secured in fixed position to and between said first pair of legs intermediate the ends thereof.

References Cited in the file of this patent

UNITED STATES PATENTS

| 134,756 | Marston | Jan. 14, 1873 |
| 652,796 | Mackey | July 3, 1900 |
| 1,603,504 | Baltzley | Oct. 19, 1926 |

FOREIGN PATENTS

| 281,121 | Great Britain | Dec. 1, 1929 |
| 531,842 | Germany | Aug. 15, 1931 |
| 549,942 | Great Britain | Dec. 15, 1942 |
| 608,865 | Great Britain | Sept. 22, 1948 |